(12) United States Patent
Wagner

(10) Patent No.: US 7,200,992 B2
(45) Date of Patent: Apr. 10, 2007

(54) METHOD FOR CONTROLLING A HYDRAULIC PISTON/CYLINDER UNIT

(76) Inventor: Paul-Heinz Wagner, Haus-Nummer 70, 53804 Much-Birrenbachshoehe (DE)

( * ) Notice: Subject to any disclaimer, the term of this patent is extended or adjusted under 35 U.S.C. 154(b) by 1 day.

(21) Appl. No.: 10/514,443

(22) PCT Filed: May 8, 2003

(86) PCT No.: PCT/EP03/04823

§ 371 (c)(1),
(2), (4) Date: May 23, 2005

(87) PCT Pub. No.: WO03/097304

PCT Pub. Date: Nov. 27, 2003

(65) Prior Publication Data

US 2005/0210872 A1 Sep. 29, 2005

(30) Foreign Application Priority Data

May 17, 2002 (DE) .............................. 102 22 159

(51) Int. Cl.
*F16D 31/02* (2006.01)

(52) U.S. Cl. .............................................. 60/379
(58) Field of Classification Search ................ 60/379, 60/381
See application file for complete search history.

(56) References Cited

U.S. PATENT DOCUMENTS 4,864,903 A * 9/1989 Bickford et al. .............. 81/467

* cited by examiner

*Primary Examiner*—Michael Leslie
(74) *Attorney, Agent, or Firm*—Diller, Ramik & Wight

(57) ABSTRACT

The control of the pressure supply to a piston-cylinder unit (10) is effected by monitoring the pressure in the corresponding line (16) through a pressure sensor (22). This pressure is measured in fixed time intervals and the changes in pressure are determined. When the change in pressure has become zero, it is detected that the set terminal pressure has been reached so that the working operation is ended. A switching to the return stroke is effected when the pressure increase in at least one time interval is greater than in at least one of the previous intervals of the working operation. The control is independent from the type of piston-cylinder unit employed and requires no sensors at the piston-cylinder unit.

14 Claims, 1 Drawing Sheet

METHOD FOR CONTROLLING A HYDRAULIC PISTON/CYLINDER UNIT

BACKGROUND OF THE INVENTION

The invention refers to a method of controlling the pressure supply of a hydraulic piston-cylinder unit connected to a pressure source, which performs a working operation comprising alternating working strokes and return strokes, as well as to a hydraulic drive means for controlling a piston-cylinder unit.

Piston-cylinder units are often used to perform a working operation with repeated working strokes and return strokes. For example, such an application is found in power wrenches where a ratchet wheel is rotated by a piston-cylinder unit through a detent that turns the ratchet wheel further on by one angular segment each time. Generally, there is a problem to detect when the working operation is terminated and the piston-cylinder unit should be retracted or left in its position. Detecting the end of a working operation, where a defined force has been exerted on a load, is difficult in practice. In general, this detection is made by an operator who determines whether the piston-cylinder unit is still moving. The stopping of the movement may be due, on the one hand, to the fact that the requested force has been exerted on the load, but also to the fact that the piston of the piston-cylinder unit has reached its end position. In a hydraulic power wrench, the user has to watch the turning of the screw. A user does not see, whether the screw is fixed or the piston-cylinder unit has reached the piston end position. Upon standstill of the piston-cylinder unit, the user has to decide whether turning the screw should be stopped because the desired torque has been reached or whether another working stroke should be performed. Thus, the operation of such a hydraulic tool is subject to the judgment of the user. This is disadvantageous. The working operation is not sufficiently secure, i.e. reaching the desired torque is not guaranteed. Neither is the working operation performed in minimum time, but it may happen that after the end of a working operation another working stroke is attempted. Further, the user must continuously be alert, resulting in high personnel costs.

SUMMARY OF THE INVENTION

It is an object of the present invention to provide a method of controlling the pressure supply of a hydraulic piston-cylinder unit, wherein the working operation is stopped automatically upon reaching the desired force.

It is provided that the change in hydraulic pressure is measured in time intervals and the working operation is stopped when the increase of pressure in one working stroke is less than a predetermined value within a predetermined time.

The method of the present invention allows for an automatic stop of the working operation due to the detection of the condition that the hydraulic pressure in a working stroke cannot rise further. The predetermined limit value is either zero or a value close to zero. The pressure source is set to a predetermined terminal value selected corresponding to the desired terminal force. The condition that the piston-cylinder unit generates this force is detected by the fact that a further pressure increase is not possible because of the pressure limit of the pressure source so that in the subsequent interval the pressure increase is less than zero or another limit value. Thus, the reaching of the aim of the working operation can be detected readily and fully automatically.

The invention is preferably applicable to hydraulic wrench devices where a piston-cylinder unit turns a screw through a ratchet drive until a desired tensioning torque is reached. Other applications are found in piston-cylinder units that move loads linearly, such as in excavators or levelling vehicles, or in driving means where an object is to be driven into a substrate with a predetermined force.

To be able to distinguish between the end of the working operation, i.e. the exertion of a certain force on the load to be moved, and the end position of the piston, it is determined whether the pressure can still rise further and with what pressure gradient it rises. When a pressure increase is determined, the end of the working stroke has not yet been reached.

The invention allows to detect the operational condition of the piston-cylinder unit by detecting the pressure in the pressure line and by forming the pressure gradient over time, without requiring end switches or other auxiliary means. It is another advantage that all pressure measurements may be made at the pressure source or the pressure generating aggregate, respectively, and that no measuring means have to be provided at the piston-cylinder unit. The maximum load on the components is reached at the end of the working operation and maintained only for a short time until it is detected that the terminal pressure has been reached and no further pressure increase occurs. This detection is usually terminated within a few milliseconds.

It is another object of the invention to provide a method of controlling a hydraulic piston-cylinder unit, wherein the switching between the working stroke and the return stroke is effected automatically and without sensors at the piston-cylinder unit.

During the working stroke, the variation of the hydraulic pressure over time is measured in time intervals and a switching to the return stroke occurs when, in at least one interval, the pressure increase is greater than in at least one previous interval of the working operation.

This aspect of the invention is based on the idea that upon reaching the piston end position, the pressure build-up in the hydraulic line quickens. This is due to the fact that the cylinder space does no longer increase and the pressure source then operates against a blocking. The increase in the pressure gradient over time is detected and used as a criterion for reaching the end position. This allows for a very fast detection of the end position. In particular, it is also prevented that upon reaching the piston end position the pressure is increased beyond the necessary amount. Thus, a very fast switching to the return stroke is effected so that unnecessary idle times are avoided and no unnecessary material stresses occur.

The invention further refers to a hydraulic drive means with a piston-cylinder unit controlled as a function of the variation in time of the hydraulic pressure, it is a particular advantage that the control means for operating the switching valve and for terminating the working operation is arranged at the pressure source and requires no connection to the piston-cylinder unit except for the hydraulic lines. The control means is independent from the size and the structure of the piston-cylinder unit. It merely operates on the basis of the pressure signals supplied thereto. The control unit is also independent from the hydraulic lines used, i.e. from their diameter and elastic behaviour. Finally, it is even independent from the type of pressure source used. The pressure source can be of a one-stage or a multi-stage design. In a multi-stage pressure source, the supply volume changes as a function of the amount of pressure.

Lastly, the invention may be employed with a double-action piston-cylinder unit connected to the pressure line or a return line, as well as with a single-action piston cylinder unit connected to only one line and comprising a return spring.

The following is a detailed description of an embodiment of the invention given with reference to the accompanying drawings.

DESCRIPTION OF THE PREFERRED EMBODIMENTS

Figure 1:
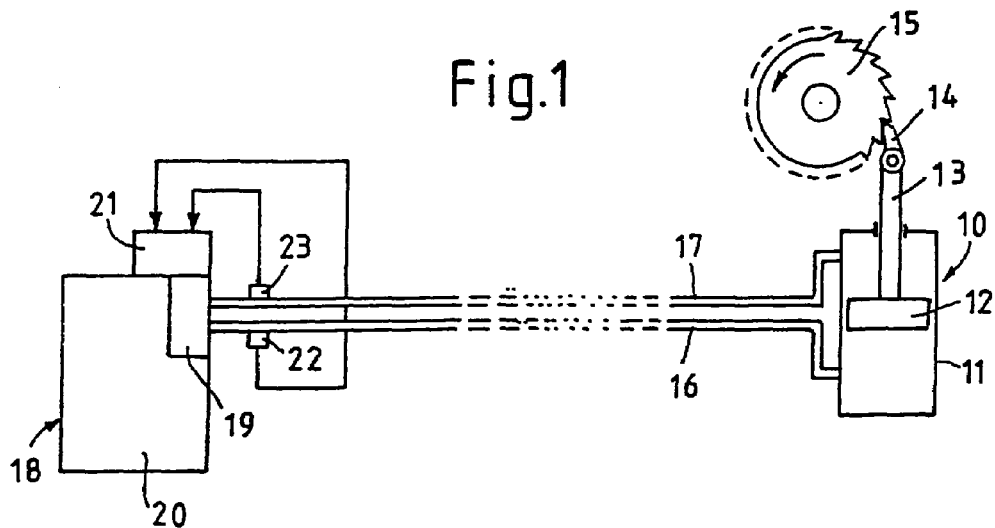
FIG. 1 is a schematic view of a hydraulic drive means comprising a piston-cylinder unit and a pressure source with a switching valve and a control means.

The embodiment of the invention described below is a hydraulic power wrench serving to tighten screws, wherein a desired terminal torque is reached. Such a power wrench includes a hydraulic piston-cylinder unit 10 with a cylinder 11 and a piston 12 movable within the cylinder. The piston 12 is connected to a piston rod 13. A ratchet lever 14 is provided at the end of the piston rod 13, engaging the toothing of a ratchet wheel 15. The reciprocating movement of the piston rod 13 intermittently turns the ratchet wheel 15 in the direction of the arrow. The ratchet wheel 15 is coupled to a socket wrench (not illustrated) that is set on the screw head to be turned. The screw is turned by the reciprocating movement of the piston 12.

Hydraulic lines 16, 17 connect the two cylinder spaces of the cylinder 11 to a hydraulic pressure aggregate 18 including a switching valve 19. By means of the switching valve 19, each of the hydraulic lines 16, 17 can alternately connected to a pressure source 20 or, without pressure, to a return means.

The switching valve 19 is controlled by a control means 21. This control means receives signals from two pressure sensors 22, 23 measuring the pressures in the hydraulic lines 16, 17. The pressure sensors 22, 23 preferably form a part of the pressure aggregate 18 so that they remain at the pressure aggregate when the lines 16, 17 are detached.

Using the pressure sensors 22, 23, the operation of the piston-cylinder unit 10 is controlled by the control means 21 in the manner described below.

Figure 2:
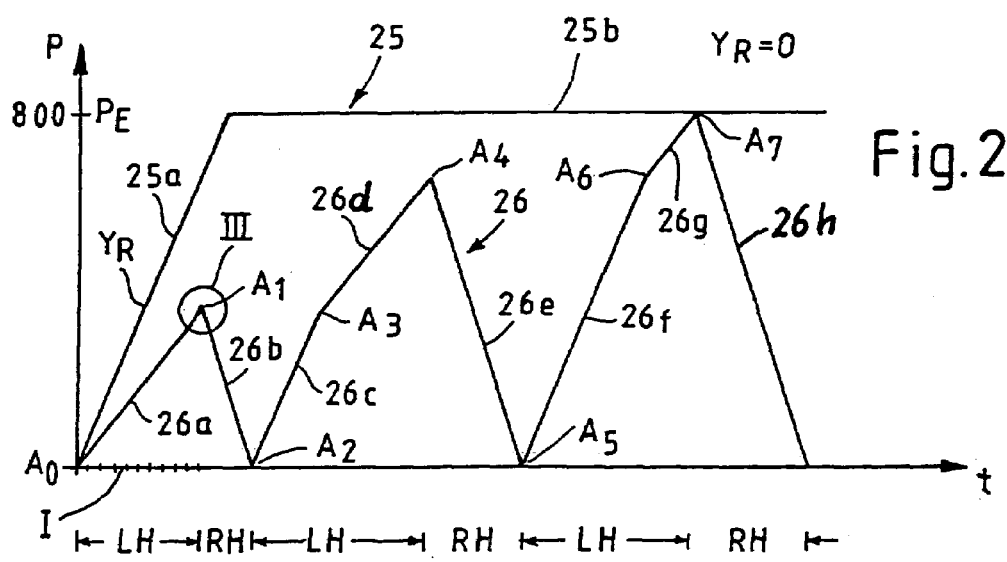
FIG. 2 is a diagrammatic view of the course in time of the pressure during alternating load and return strokes of the piston-cylinder unit.

FIG. 2 illustrates the characteristic pressure-time curve of the pressure aggregate 18, which results when the pressure aggregate works against a shut-off line. Here, a single-stage operation is assumed, where the pressure aggregate operates at a constant supply rate over the entire pressure range. Starting from the point $A_0$, pressure builds up in accordance with a substantially linear function, until a terminal value $P_E$ is reached that may be 800 bar, for example. The terminal value $P_E$ is set by the user. This is the pressure that defines the tightening torque of the screw to be turned and at which the working operation should be terminated. The characteristic pressure-time curve of the respective pressure aggregate 18 is previously determined in a calibrating operation and is then stored. The time axis t is divided into time intervals I. The duration of a time interval is 10 ms. It may be changed depending on the pressures or on the screwing tool or the pressure aggregate. A measure of the pressure P is made at each interval I. Since the intervals I each have the same duration, the differential quotient y=dP/dt is determined by evaluating the pressure difference dP occurring within a time interval and storing it in digital form. With the reference curve 25, the differential quotient has the value $y_R$ in the rising portion 25a. When the terminal pressure $P_E$ is reached, the curve 25 passes into the saturation portion 25b, where the pressure remains constant. In the saturation portion, the differential quotient $y_R$ is zero.

In FIG. 2, the curve 26 illustrates an example of three working strokes LH of a working operation. In the portion 26a, the pressure in line 16 measured by the pressure sensor 22 rises substantially linearly, until the piston 12 has reached its frontward end position (point $A_1$). Then, the return stroke is performed by the control means 21 switching the switching valve 19 so that the line 17 is pressurized and the line 16 is connected to the return means. The portion 26b in FIG. 2 illustrates the return stroke. At the end of the return stroke, a terminal pressure builds in the line 17 that is less than the terminal pressure $P_E$ in line 16 and may be 100 bar, for example. This terminal pressure in line 17 is generated when the piston 12 has reached its rearward end position. This corresponds to the point $A_2$ of curve 26. Reaching the terminal value of the return pressure is detected by the pressure sensor 23 and signalled to the control means 21. The control means then switches the switching valve 19 so that the next working stroke LH is started at point $A_2$. This working stroke has a portion 26c having the same rise as the portion 25a of the reference curve 25, since the piston first has to work against the screw already tightened during the first working stroke and forming a fixed counter-bearing. When the point $A_3$ is reached, where the same pressure prevails as at the previous point $A_2$, the screw turns again so that a portion 26d follows, wherein the rise is less than in the portion 26c. The portion 26d has substantially the same rise as the portion 26a of the previous working stroke.

At point $A_4$, the piston 12 has reached its frontward end position again and a return stroke RH follows, where the pressure drops to zero in the portion 26e. The portion 26e has the same descending slope as the portion 26b of the previous return stroke.

At point $A_5$, the next working stroke starts with a portion 26f extending to a point $A_6$, where the pressure is the same as the maximum pressure reached at point $A_4$ in the previous working stroke. The portion 26f again has the same rise as the portion 25a of the reference curve. Adjoining portion 26f is a portion 26g, where the screw is turned further until the terminal pressure $P_E$ is reached at point $A_7$.

The control means 21 determines when the differential quotient y of the curve 26 becomes zero at point $A_7$. Then, the working operation (screwing operation) is considered terminated and a portion 26h follows, where the piston 12 is returned to its rearward end position.

At point $A_7$, it may additionally be checked, whether the set terminal pressure $P_E$ of 800 bar has been reached. When this terminal pressure has not been reached, the working operation is discarded as not correctly performed.

During the working operation, the differential pressure values of several successive intervals are stored and the average value is calculated from the stored values. Thereby, it is avoided that individual freak values cause an erroneous interpretation.

Figure 3:
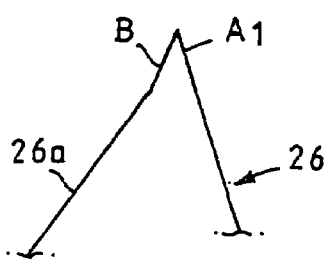
FIG. 3 is an enlarged view of the detail III of the diagram in FIG. 2.

The following is an explanation of the detection of the switching points, where the working stroke LH is ended and the return stroke RH is switched to. This detection is also effected by determining the gradient of the curve 26. FIG. 3 is an enlarged view of point $A_1$ of curve 26. The portion 26a ends when the piston 12 has reached its frontward end position. A portion B follows that has the same rise as the portion 25a of the reference curve 25. By a continuous measuring of the pressure gradient, it is then detected that the rise in the portion B has increased when compared to the previous portion 26a. This increase in the pressure gradient is the criterion for the piston 12 having reached the point of return. If 20 values of the pressure gradient are stored, respectively, to calculate the average value, the portion B lasts 20 ms for 20 intervals of 1 ms each. After this period, the switching valve 19 is operated to start the return stroke.

The above described manner of detecting the piston end position is advantageous in that it is independent from the absolute pressure and can be applied without special adjustments in aggregates of different type and power. The piston end position is also detected immediately without the pressure continuing to build up. It is another advantage that the control means 21 is independent from the pressure aggregate 18 and can be used the same for different pressures and outputs.

The general processing of the measured results can be effected such that the average of the last five measurements is compared to the current measurement each time. Should the value of the differential pressure increase or drop per interval, the change is judged according to the above described contexts and is processed as a control signal.

Although a preferred embodiment of the invention has been specifically illustrated and described herein, it is to be understood that minor variations may be made in the apparatus without departing from the spirit and scope of the invention, as defined by the appended claims.

What is claimed is:

1. A method of controlling the pressure supplied by a pressure source (20) to a hydraulic piston cylinder unit (10) for performing a working operation comprising the steps of
measuring the hydraulic pressure during a multiplicity of time intervals (I) during each of a plurality of power strokes (26; 26c, 26d; 26f, 26g) of the working operation to effect the termination thereof, and
terminating the working operation when the rise of the hydraulic pressure in one working stroke (26f, 26g) is less (26g), within a predetermined incrementally measured time period, than a pre-determined limit value (A).

2. The method of claim 1, wherein the change in the pressure is measured and processed as a parameter in digital form in each of a plurality of time intervals (I).

3. The method of claim 2, wherein a calibrating operation is performed to determine a characteristic pressure-time curve (25) of the pressure source (20), the pressure source supplying against a blocking and the pressure rising until a terminal pressure ($P_E$) is reached.

4. The method of claim 1, wherein a calibrating operation is performed to determine a characteristic pressure-time curve (25) of the pressure source (20), the pressure source supplying against a blocking and the pressure rising until a terminal pressure ($P_E$) is reached.

5. A method of controlling the pressure supply to a hydraulic piston-cylinder unit (10) connected to a pressure source (20), said unit performing a working operation with alternating working strokes (LH) and return strokes (RH), wherein, during a working stroke, the change in the hydraulic pressure over time is measured in time intervals (I) and a switching to the return stroke (RH) is effected when the pressure increase (B) in at least one time interval of a working stroke (LH) is greater than in at least one of the previous intervals of the working operation.

6. The method of claim 5, wherein the pressure increase in the time interval is compared to the average of the pressure increases of several previous time intervals.

7. The method of claim 6, wherein the change in the pressure is measured and processed as a parameter in digital form in each of a plurality of time intervals (I).

8. The method of claim 6, wherein a calibrating operation is performed to determine a characteristic pressure-time curve (25) of the pressure source (20), the pressure source supplying against a blocking and the pressure rising until a terminal pressure ($P_E$) is reached.

9. The method of claim 5, wherein the change in the pressure is measured and processed as a parameter in digital form in each of a plurality of time intervals (I).

10. The method of claim 5, wherein a calibrating operation is performed to determine a characteristic pressure-time curve (25) of the pressure source (20), the pressure source supplying against a blocking and the pressure rising until a terminal pressure ($P_E$) is reached.

11. A hydraulic drive means comprising a hydraulic piston-cylinder unit (10) connected to a pressure source (20) and a switching valve (19) for controlling the piston-cylinder unit (10) to perform a working operation of working strokes (LH) and return strokes (RH), and a control means for operating the switching valve (19), wherein a pressure sensor (22) is provided that measures the pressure of the pressure source (20) during the working stroke (LH), and wherein the control means (21) measures the change in pressure in time intervals and terminates the working operation when the rise of the hydraulic pressure in one working stroke is less, within a predetermined period, than a predetermined limit value.

12. The hydraulic drive means of claim 11, wherein the control means (21) and the switching valve (19) are arranged at the pressure source (20).

13. A hydraulic drive means comprising a hydraulic piston-cylinder unit (10) connected to a pressure source (20) and a switching valve (19) for controlling the piston-cylinder unit (10) to perform a working operation of working strokes (LH) and return strokes (RH), and a control means for operating the switching valve (19), wherein a pressure sensor (22) is provided that measures the pressure of the pressure source (20) during the working stroke, and wherein the control means (21) measures the change in pressure in time intervals and switches to the return stroke (RH) when the pressure increase in at least one time interval is greater than in at least one of the previous intervals of the working operation.

14. The hydraulic drive means of claim 13, wherein the control means (21) and the switching valve (19) are arranged at the pressure source (20).

* * * * *